United States Patent [19]

Abbey et al.

[11] Patent Number: 4,525,260

[45] Date of Patent: Jun. 25, 1985

[54] CATHODIC ELECTROCOATING COMPOSITION COMPOUNDED WITH LATEX BINDER AND POSSESSING ENHANCED GLOSS

[75] Inventors: Kirk J. Abbey, Cleveland, Ohio; James R. Erickson, Katy, Tex.

[73] Assignee: SCM Corporation, New York, N.Y.

[21] Appl. No.: 513,620

[22] Filed: Jul. 14, 1983

[51] Int. Cl.³ .............................................. C25D 13/06
[52] U.S. Cl. .................................. 204/181.7; 524/555
[58] Field of Search ................... 204/181 C; 524/555; 428/500, 461

[56] References Cited

U.S. PATENT DOCUMENTS

| | | | |
|---|---|---|---|
| 3,873,488 | 3/1975 | Gibbs et al. | 260/29.7 H |
| 3,882,009 | 5/1975 | Wagener et al. | 204/181 |
| 3,994,792 | 11/1976 | Wagener et al. | 204/181 |
| 3,998,776 | 12/1976 | Wagener et al. | 260/20.6 |
| 4,017,372 | 4/1977 | Wagener et al. | 204/181 |
| 4,175,018 | 11/1979 | Gacesa | 204/181 T |
| 4,204,932 | 5/1980 | McGinniss et al. | 204/181 C |
| 4,225,406 | 9/1980 | Wagener et al. | 204/181 C |
| 4,225,407 | 9/1980 | Wagener et al. | 204/181 C |
| 4,294,741 | 10/1981 | Bosso | 260/29.6 NR |
| 4,379,869 | 4/1983 | Siadat et al. | 523/206 |
| 4,380,601 | 4/1983 | Welsh et al. | 525/555 |
| 4,395,444 | 7/1983 | Das et al. | 427/388.4 |
| 4,399,254 | 8/1983 | Das et al. | 524/745 |
| 4,432,850 | 2/1984 | Moriarity et al. | 204/181 C |

FOREIGN PATENT DOCUMENTS 3123536 12/1982 Fed. Rep. of Germany .

*Primary Examiner*—John F. Niebling
*Assistant Examiner*—B. J. Boggs, Jr.
*Attorney, Agent, or Firm*—A. J. Gibbons; M. H. Douthitt

[57] ABSTRACT

An improved cathodic electrocoating composition comprises an aqueous suspension of synthetic, cation-active, film-forming latex particles characterized by a latex gel content that is not substantially above about 10%.

7 Claims, No Drawings

CATHODIC ELECTROCOATING COMPOSITION COMPOUNDED WITH LATEX BINDER AND POSSESSING ENHANCED GLOSS

This invention relates to an improvement in aqueous cathodic electrocoating composition, more particularly to same containing a suspension of film-forming synthetic latex particles, and electrocoating with said composition.

BACKGROUND OF THE INVENTION

The application of protective and decorative coatings in the nature of paint or varnish by electrophoretic deposition now is a large industry. Quite commonly such coating processes are called "electrocoating". U.S. Patent and Trandmark Office Class 204, subclass 181, relfects the large growth of this technology in recent years.

Generally, in an electrocoating process of the type concerned here, one or more cathode workpieces and one or more counterelectrodes (anodes) are maintained for a short period of time in an electrical circuit with a dilute aqueous dispersion of film-forming paint binder, usually pigmented, between them. In most such coating operations a net unidirectional electric current is passed between these electrodes at fair voltage (e.g., 50+V.). Generally such current is rectified ac current. This causes deposition of the coating on the electrodes (workpieces). Most frequently the binder dispersion is maintained as a bath in which the electrodes are at least partially immersed. Other methods for forming the electrical circuit also have been proposed, e.g., by showering the workpieces with continuous streams of the current-carrying aqueous coating dispersion.

Representative of the earliest practical electrocoating is that shown in Allan E. Gilchrist's U.S. Pat. No. 3,230,162 of 1966. More recently cationic or cathodic electrocoating has become popular. U.S. Pat. No. 3,799,854 and many subsequent patents involving the electrodeposition of blocked isocyanate and amino resins onto a cathodic workpiece, and the subsequent curing of the electrodeposited film into a crosslinked structure are representative of such cathodic electrocoating. These very practical techniques employ comparatively low molecular weight, structurally ionized resinous material as their fundamental paint binders for the electrocoating, in contrast to the instant latices made by emulsion polymerization.

That is not to say that the cathodic electrodeposition of synthetic latices has not been proposed before. Representative cathodic electrocoating proposals using synthetic latex binders include those of these U.S. patents: Nos. 3,873,488; 3,882,009; 3,994,792; 3,998,776; 4,017,372; 4,225,406; and 4,225,407.

Synthetic latics made by emulsion polymerization as cathodic electrocoating binders have been regarded as having the inherent potential of possessing a number of desirable characteristics such as high coulombic efficiency, high molecular weight for various properties, crosslinkability if desired, low cost, and versatility of composition.

In the emulsion polymerization of cathodic electrocoating latices appreciable amounts of gels (microgels) often form. This intractable material has very high molecular weight. We have found that formost low gloss applications such gel can be tolerated, but it seriously detracts from the ability to obtain optimum gloss and smoothness, as for a one-coat finish. The presence of gel can be assessed conveniently by casting the film of the latex on an aluminum sheet, extracting with acetone, and noting the weight of undissolved residual polymer.

Advantages of the instant invention over prior synthetic cathodic electrocoating latex compositions include the capacity to produce optimally glossy films in a highly efficient manner; additionally, the electrodeposited films of the inventive compositions appear to have enhanced solvent resistance.

BROAD STATEMENT OF THE INVENTION

The instant invention is a cathodic electrocoating composition comprising an aqueous suspension of synthetic cation-active, film-forming latex particles characterized by latex gel content that is not substantially above about 10%, and preferably is mush less.

DETAILED DESCRIPTION OF THE INVENTION

The instant latex is prepared by emulsion polymerization of addition polymerizable materials in aqueous dispersion, preferably ethylenically unsaturated monomers. The latex should be film-forming on a cathode during the wet electrocoating operation, that is it should have a Tg of about $-40°$ to $+60°$ C. and preferably about $-10°$ to $+30°$ C. The latex is cation-active by virtue of being amino-stabilized. By this is meant that such cation activity is provided fundamentally by a small proportion of amino, amidino, and/or guanadino functionality that is structurally a part of the latex molecule and/or is sorbed onto the surface of the latex, as in the form of a surfactant having such functionality. Additional cation activity also can be imparted by, for example, beta hydroxyethyl quaternary ammonium functionality of the latex and/or such sorbed surfactant.

Representative nonionic monomer types useful for forming suitable latices include alkenyl aromatic compounds such as styrene compounds; derivatives of alpha-methylene monocarboxylic acids such as acrylic esters, acrylic nitriles, and methacrylic esters; derivatives of alpha-, beta-ethylenically unsaturated dicarboxylic acids such as maleic esters and unsaturated alcohol esters; conjugated dienes; unsaturated ketones; unsaturated ethers; and other polymerizable vinylidene compounds such as vinyl chloride and vinyl fluoride. Specific ethylenically unsaturated compounds useful for the instant latices include styrene, alpha-methylstyrene, para-methylstyrene, ethylstyrene, diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl alpha-chlorocrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene. Styrene units are especially desirable in copolymers for the instant service, not only because styrene is economical, but also because it helps to impart gloss to the cured coating.

Most of the foregoing nonionic monomers tend to form water-insoluble polymers, and they are usually copolymerized with monomers having hydrophilic character for the purpose of, amongst other things, crosslinking capability and/or providing the needed cation activity. Representative of such modifying monomers are hydroxyethyl acrylate, hydroxyethyl methacrylate, hydroxypropyl methacrylate, acrylamide, methacrylamide, and modified acrylamides such as diacetone acrylamide and diacetone methacrylamide, and dimethylaminoethyl methacrylate, diethylaminoethyl methacrylate, t-butylaminoethyl methacrylate, isopropylaminopropyl methacrylamide, dimethylaminopropyl methacrylamide.

Hydrophilic monomer units in the latex structure that are not charge-bearing, e.g., those having hydroxyl and/or acrylamide functionality, can be used in modest levels; typically they are broadly used to constitute between about 2 and about 30 weight percent of the resulting thermosetting latex polymer solids and advantageously about 5-15%. The charge-bearing hydrophilic monomers for making a latex structurally cation-active desirably are used in a proportion of no more than about 5% by weight of the latex polymer solids, and preferably they amount to 0.5% or even less. Thus the resulting latex, in spite of these modifications, can be considered hydrophobic.

Emulsion polymerization to make the latex generally is carried on in a reaction zone with agitation at atmospheric pressure using a temperature of about 25° to 90° C. Typically the monomers are charged gradually to an aqueous body which can contain all of the water or only an initial fraction of it, such fraction being augmented as the reaction continues. Initiator for the latex polymerization can be present initially in the aqueous body, and it also can be added concurrently with the monomer charge. So can surfactant if surfactant is to be used at all. A preferred latex preparation is a seeded semi-continuous emulsion polymerization wherein about 0.5-10% of the monomer is used to establish a polymerized seed population by emulsion polymerization, then the rest of the ingredients are added to the recipe to form polymer upon the seeds. Small amounts of surfactants such as fatty imidazolines, ethoxylated fatty guanadines (e.g. Aerosol C61, a trademark of Americal Cyanamid Company), nonionics such as highly ethoxylated octyl and nonyl phenols, ethoxylated fatty alcohols, and amine-functional polymeric surfactants also can be used if necessary or desirable. In the instant latices the concentration of oligomeric or polymeric starting material is quite low (not substantially above about 5%, e.g., from oligomeric or polymeric surfactant), the vast preponderance of the latex provided by the monomers charged.

Conventional additives for latex compositions can be included in the emulsion polymerization recipe, and some can be added later. Such materials include chain transfer agents, shortstopping agents, buffers, antifoaming agents, chelating agents, plasticizers, tinting materials, and bactericides or other preservatives. In a preferred operation a heel of partially-reacted latex is used (thereby providing a preformed seed); additional water, the rest of the monomers and often additional surfactants and initiators then are the customary feeds in incremental or continuous fashion while the contents of the polymerization zone are agitated under conditions of temperature and pressure suitable for maintaining the polymerization. Preferably the temperature for the particular initiator system and polymerization is between about 70 andabout 85° C. and the pressure is atmospheric, although higher pressures, and thus temperatures are possible. Advantageously the rate of monomer addition is low enough to control the rate of polymerization.

Chain transfer agents conventionally have been used to control molecular weight of latics, thus tending to suppress gel formation. However, we believe that the adverse effect of even very minor proportions of gel in latics for cathodic electrocoating has never been reported heretofore, assuming it was even noted previously. It is not surprising that such effect might go unnoticed; the same latices with modest gel contents, applied by brush or cast by drawdown bar in air, give no special problems or bad effects. Apparently the deposition and coalescence action of such latices under water, (as in an electrocoating bath) differ substantially from the corresponding action in air and are far more sensitive to the presence of a little gel.

The initiators produce free radicals for the latex polymerization and can be, for example, certain redox systems such as: hydroxylamine hydrochloride in combination with t-butylhydroperoxide, azo types such as 2,2'-azobis (amidinopropane hydrochloride) ("AAP"), 2,2'-azobis isobutyronitrile ("AIBN"), 2,2'-azobis (2-isopropylimidazolium) dichloride, 2,2'-azobic (2-aminopropane) sulfate, or even an electron beam or gamma radiation. The latex is prepared at a polymer solids (NV) content that usually is at least about 35%, preferably about 40-60%, and even as high as about 70% in some cases. pH of a finished latex batch for the electrocoating purpose usually will be between about 1 and about 6, and generally will be between about 2 and about 5. For the electrodeposition process latex emulsions are diluted with water to a solids concentration generally not above about 25% and advantageously between 1 and 15%.

latex particle size advantageously averages (weight average) between about 1000 Å and about 4000 Å although ones from 300 Å to 6000 Å useable. By use of appropirate monomeric material in their preparations functionality can be incorporated into the molecular structures of the latex and the resinous pigment dispersant for rendering these structures crosslinkable with each other or self-crosslinking. Thus, for example, blocked isocyanate functionality so incorporated can be made to crosslink upon curing with labile hydrogen functionality such as hydroxyl, unhindered secondary amine, amide, and/or thiol funtionality present. If both sorts of functionality are part of the same molecular structure, that structure will be self-crosslinkable; if one sort such as the blocked isocyanate is part of one structure and the other such as labile hydrogen is part of another polymer molecule, these diverse structures can be crosslinked with each other. Typical blocked isocyanate monomers for such use are, for example, 2-isocyanatoethyl methacrylate blocked with 2-butanone ketoxime or the adduct of either toluene diisocyanate or isophorone diisocyanate havine one isocyanate group reacted with hydroxyethyl methacrylate and the other blocked with caprolactam or other blocking compound such as an oxime. A methylolacrylamide such as isobutoxyl methylolacrylamide also can be used, but as such funtionality generally crosslinks most satisfactorily with some acidity present and often tends to give appreciable microgel formation, blocked isocyanates are preferred. Hydroxy functional acrylates are the preferred labile hydrogen-providing materials for a polymerization.

Curiously, however, it has been found that only a limited proportion of resinous pigment dispersant can be electrodeposited with latex for effective crosslinking therewith before solvent resistance of the cured film will be markedly adversely affected. Thus, when a dispersant proportion amounts to no more than about 150% of the latex crosslinkable therewith, the solvent resistance of the cured film is lowered somewhat, but such loss usually can be tolerated. However, when an appreciably greater proportion of such dispersant is present, the solvent resistance of the cured film is very badly affected-unless the electrodeposit also contains some additional material, i.e., an external crosslinker, that will crosslink with at least the dispersant upon curing. Useful external crosslinkers include acid functional aminoplasts, e.g., melamine resins such as Cymel 1141, a tradmark of American Cyanamid Company, or a blocked isocyanate such as isophorone diisocyanate blocked with epsilon caprolactam or other conventional blocking agent.

Solvent resistance of the cured film also can be obtained by use of such external crosslinker that has been codeposited with latex and resinous pigment dispersant that will not crosslink with each other, but will crosslink with such external crosslinker film component.

As noted above, adequate cation activity for the latex can be provided by a very small porportion of amino, amidino, and/or guanadino functionality that is structurally a part of the latex molecule and/or sorbed onto the surface of the latex. Polymerizing charge-bearing hydrophilic monomer units into the latex structure certainly is the positive way for imparting the needed cation activity thereto. It should be noted, also, that initiators such as 2,2'-azobis (amidinopropane hydrochloride) (AAP) break down in use to provide structural amidino functionality in the polymer while the fatty imidazoline surfactants can supply useful amidino functionality for sorption onto the surface of latex having otherwise little or no cation activity. Similarly, ethoxylated fatty guanadine surfactants can impart guanadino functionality to the surface of such latices for rendering or helping to render them adequately cation active.

Suitable resinous pigment dispersants (pigment grind vehicles) for the instant invention will have functionality that is crosslinkable with that of a latex or an external crosslinker. Advantageous resins for such service include acrylic resins having some hydroxyl functionality and average mol weight of about 2000 to 5000, and epoxy resins modified with an amine, such epoxy resin having average mol weight of about 800–1600. An electrocoating binder of the present invention ordinarily will be predominantly latex with the corsslinkable dispersant being from about 0.1 to 40% and preferably about 5 to 30% of the binder and the external crosslinker if needed, being about 5 to 30% and preferably about 5 to 25% of the binder.

Customarily the wet electrocoated part is drained, blown with air to remove loosely adhering liquid, and/or rinsed. Advantageously the final rinse is with deionized water. Rinsing also can be done with a permeate from ultrafiltration of an electrocoat bath. Initial rinsing can be done with an aqueous dispersion recovered from later rinsing, e.g., from the final rinse.

Cure of the wet electrodeposit to its final dry and hardened state generally is done by baking the coated article at about 120° to 230° C. for 5 to 40 minutes, although radiation curing also is possible, e.g., by electron beam, gamma radiation, or by ultriviolet light if a sensitizer is incorporated into the film and the light is not masked by pigmentation.

Pigmentation for the electrocoating composition typically can be provided by mixing therein pigments such as titanium dioxide, iron oxides, lead chromate, carbon black, cadmium yellows and reds, clay, silica, talc, phthalocyanine blue, chromium yellow, aluminum flake, and other conventional pigmentary materials and even fine particles of hard polymer or resin, some of which can be caused to fuse upon curing or even to crosslink with other electrodeposited materials if desired. While such pigmentary materials usually form a minor proportion of the paint solids that are to be electrocoated, they can on occasion constitute a major proportion, especially where a plastic pigment fuses and/or reacts upon curing to give additional binding to the particles present. Pigments, particularly mineral pigments, usually are added to the electrocoating composition in the form of a pigment grind using a resinous vehicle that has molecular weight substantially below that of the latex.

Counterions for amino functionality in the coating composition are provided in the composition by acids such as formic, acetic, lactic, and/or phosphoric acids. pH of a typical composition of this invention for the instant pigmented cathodic electrocoating will be between about 3 and about 6, and generally it is advantageous to be about 4 to 5, with about 1 meq. of acid per meq. of base present.

The presence of solvents such as alkoxyalkanols, hydrocarbons such as a maphtha or toluene, or an acetate such as butyl acetate tends to lower the rupture voltage of the electrodeposited latex film. Hence, little or no solvent is preferred in manufacture of the latex, and any solvent concentration in the electrocoating composition, based on weight of nonvolatile matter, best is limited to about 15% by weight, maximum. Such solvent customarily is introduced into a formula with a pigment grind.

Desirably the free monomer in the latex, and, thus, in the cathodic electrocoating composition, is maintained very low. By using one or more clean-up procedures at the end of the latex polymerization, one can accomplish this. One such procedure is to treat the latex finally with a series of successive small initiator additions and to raise the final temperature for reacting virtually all of the free monomer present, if not all. Other useful techniques include adding a small proportion of highly reactive monomers such as an acrylate to combine with, for example, free vinyl acetate, or to stop a styrene feed near the end of the latex-making reaction (because such monomer can inhibit the complete polymerization of other less reactive monomers present). Vacuum stripping is an alternate method of free monomer removal. Gas chromatography is useful for determining the level of residual monomer, Gas chromatography is useful for determining the level of residual monomer, which desirably is not more than about 2% and is preferred to be much less.

For the highest quality of cathodic electrodeposition desired here it is especially important to remove amino monomers and amino initiator fragments, which can impart roughness to a cathodically-electrodeposited film of the latex; "amino" is used here in the broad sense to comprehend monomers and fragments of molecular weight not above 300 and having amino, guanadino, and/or amidino functionality, and, in general, nitrogenous functionality that is basically-reaction in aqueous dispersion. When such monomer is fully reacted, it is effectively sequestered. Ion exchange of the latex with an ion exchange resin in acid form is useful for eliminating virtually all of the free amino monomer and amino initiator fragments; these should not be substantially above about 0.1% of the latex solids.

As mentioned above, an electrocoating bath composition here advantgeously will contain about 1 to 15% by weight of solids. The replenishment feed composition for an instant cathodic electrocoating bath will have greater concentration than this, and it can reach 50–60% of such solids. By using a replenishment composition deficient in acid relative to ionizable amino, guanadino, and/or amidino group in such replenishment composition, one can help to keep the buildup of acid in an operating bath under control. The bath also can be purged by use of membranes which will permit bath components to be withdrawn quite selectively as by ultrafiltration.

The following examples illustrate the invention, but should not be construed as limiting it. In this specification all percentages are weight percentages, all parts are parts by weight, and all temperatures are in degrees C. unless otherwise expressly indicated. In the examples the electrocoating test tank held a liter of paint dispersion. The tank was divided into a larger dipping section and a smaller agitator section by a vertical wier to one side that fixed the depth of the painting bath. The wier was short of the bottom of the tank to permit recirculation of bath dispersion from the agitator section into the bottom of the dipping section. Paint dispersion flowed over the wier into the agitator section, then was impelled downwardly by a propellor-type agitator into the bottom of the dipping secton. This created a circulation of the paint dispersion with a level top surface in the dipping section.

A 4"×4" (10.2 cm) conventionally phosphated (Parker Bonderite 1000 iron phosphated) 20 ga. (0.95 mm.) steel panel was lowered over about 9 seconds to a depth of 3½" (8.9 cm.) with power on, the immersion being made about centrally to the wall confines of the dipping section of the tank. The tank was charged as an anode and panel as a cathode with constant voltage impressed therebetween. Power was left on for 64 seconds after a panel was fully immersed, then turned off and the wet coated panel withdrawn from the bath. It was rinsed with deionized water. Each panel was baked for 20 minutes at a temperature between 150° and 190° to cure the resulting wet electrodeposited film.

The electrocoating process was very rapid. The wet coating was substantially complete in a few seconds after a panel had been immersed to the final depth (with attendant virtually complete shutoff of current in the circuit). The cured coatings were ostensibly perfect and smooth. Their thicknesses were from approximately ½ mil (0.013 mm.) to 1½ mils (0.038 mm.), depending upon the particular test conditions.

Each latex was diluted with deionized water to make a coating composition having 5% solids (NV) content. For each coating composition tested panels were electrocoated from a 25° C. bath at the following constant voltages: 100, 150, 200, and 250; and from a 45° C. bath at voltages of 200 and 300. The 60° gloss of a cured coating was measured with a Hunter laboratory D48D gloss meter standardized with a black glass plate. Glosses were averaged for a particular coating composition. That average is the number for gloss value reported in the examples which follow. The gloss test used was the ASTM-523-80 60° specular gloss test.

Gel content of a latex was measured by casting a film of the latex with a No. 38 wire-wound drawdown bar onto aluminum foil, air drying the film for 2 hours, immersing the thus-coating coil in acetone at room temerature for three days, then ascertaining the undissolved polymer remaining as a percentage of the dried latex. Two determinations were made for each latex except in Example 5 where only one was made.

EXAMPLES 1-12

Twelve latices were prepared according to the recipes tabulated below. In these prepartions the Group A ingredients for each latex were heated in an agitated reactor to 75° C. which was sparged with nitrogen. Thereafter a nitrogen gas blanket was maintained over the agitated reaction mixture. The Group B ingredients were added, and, after about 5 minutes, the Group C ingredients. This was followed by a 4-hour addition of the group D ingredients and, starting simultaneously with the Group D ingredients, a 4½-hour addition of the Group E ingredients. After the addition of the Group E ingredients had been completed, the mixture was held at 75° with agitaton for about 1 hour then cooled to room temperature. The synthetic latices of the resulting emulsions each had weight average molecular weight estimated to be well above 100,000. The latex solids content of a dispersion, like the other nonvolatile matter contents ("NV") referred to in this specification, can be determined from the weight remaining after evaporating volatile matter at 125° C. for 30 minutes from a thin film of sample inhibited against further polymerization with hydroquinone. The phosphoric acid in the latices amounted to one meq. of its first hydrogen per meq. of base present.

TABLE I

| Group | Ingredients | Parts per 100 parts of Monomer | |
|---|---|---|---|
| A | Deionized Water | 134.0 | |
| | Triton X-405* | 0.1 | |
| | $H_3PO_4$ (85.6% solution in water) | 0.1 | |
| B | Butyl Acrylate (BA) | 0.7 | |
| | Methyl Methacrylate (MMA) | 1.3 | |
| | $CBr_4$ (for Example 1 only) | 1.0 | |
| C | Deionized Water | 4.2 | |
| | AAP[a] | 0.1 | |
| D | As tabulated in Table II for each Example | | |
| E | Deionized Water | 11.4 | |
| | Triton X-405* | 1.3 | |
| | AAP[a] | 0.3 | for Examples 1-4, inclusive |
| | | 0.2 | for Examples 5-9, inclusive |

[a] 2,2'-azobis (2-amidino propane hydrochloride)
*The trademark of Rohm & Haas Company for the nonionic surfactant, ethoxylated octylphenol having an average of 40 mols of ethylene oxide per mol of the phenol.

TABLE II

| | | Group D Ingredients for each Example | | | | | | | | | | | |
|---|---|---|---|---|---|---|---|---|---|---|---|---|---|
| | Example | Parts per 100 parts of Monomer | | | | | | | | | | | |
| Ingredients | No. | 1 | 2 | 3 | 4 | 5 | 6 | 7 | 8 | 9 | 10 | 11 | 12 |
| BA | | 49.2 | 49.2 | 49.2 | 49.2 | 48.9 | 48.5 | 44.7 | 47.0 | 46.3 | 49.5 | 48.1 | 49.8 |
| MMA | | 32.7 | 32.7 | 32.7 | 32.7 | 31.5 | 28.6 | 34.4 | 38.3 | 35.3 | 34.5 | 38.9 | 36.4 |
| HPMA[a] | | 8.6 | 8.6 | 8.6 | 8.6 | 6.5 | 9.8 | — | — | — | 6.5 | — | 4.3 |
| HEA[b] | | — | — | — | — | — | — | 7.9 | 5.2 | 5.2 | — | 3.5 | — |
| BIEM[c] | | 7.3 | 7.3 | 7.3 | 7.3 | 10.9 | 10.9 | 10.9 | 7.3 | 10.9 | 7.3 | 7.3 | 7.3 |
| DMAEMA[d] | | 0.2 | 0.2 | 0.2 | 0.2 | 0.2 | 0.2 | 0.2 | 0.2 | 0.2 | 0.2 | 0.2 | 0.2 |
| n-Dodecyl Mercaptan | | 0.2 | 0.2 | 0.6 | 0.2 | — | 0.7 | — | 0.7 | 0.7 | — | — | 0.7 |
| CBr$_4$ | | — | 0.8 | — | 0.4 | 1.2 | — | 1.2 | — | — | 1.2 | 1.2 | — |
| Latex Average Particle Size, Å | | 4900 | 4300 | 2400* | 4700 | 4500 | 4800 | 4500 | 4400 | 4700 | 5500 | 5400 | 4800 |
| Polydispersity | | 1.14 | 1.23 | — | 1.15 | 1.11 | 1.11 | 1.08 | 1.11 | 1.07 | 1.11 | 1.09 | 1.09 |

[a]HPMA — Hydroxylpropyl methacrylate
[b]HEA — 2-Hydroxyethyl methacrylate
[c]BIEM — Isocyanatoethyl methacrylate blocked with 2-butanone ketoxime
[d]DMAEMA — N,N—dimethyl-2-aminoethyl methacrylate
*Number average measured by turbidity only. All others listed are weight averages measured by disc centrifuge photosedimentometers (U.S. Pat. No. 4,311,039).

The resulting latices were cation-exchanged with Amberlite 200C in acid form to remove therefrom virtually all amino intiator fragments and amino monomers. Amberlite 200C is the trademark of Rohm & Haas Corporation for a macroreticular strongly acidic styrene/divinylbenzene ion exchange resin having the following properties: apparent wet density of 0.8, shipping weight 50 lbs./ft.$^3$, effective size approximately 0.61 mm. diam., and moisture content approximately 48%.

Cationic electrocoating baths were operated with each of the ion exchanged latices diluted to 5% N.V. Table III shows the 60° gloss value versus gel content.

TABLE III

Gloss Versus Gel Content of Latex

| Example No. | Gloss Value (60°) | % Gel |
|---|---|---|
| 1 | 82 ± 10 | 0.6 ± 0.4 |
| 2 | 72 ± 11 | 1.2 ± 1.2 |
| 3 | 8 ± 1 | 20 ± 8 |
| 4 | 1 | 57 |
| 5 | 77 ± 4 | 0.68 ± .04 |
| 6 | 1.8 ± 0.1 | 24 ± 2 |
| 7 | 41 ± 8 | 0.00 ± 0.00 |
| 8 | 6 ± 1 | 6 ± 2 |
| 9 | 5 ± 1 | 9 ± 1 |
| 10 | 86 ± 9 | 0.03 ± 0.03 |
| 11 | 85 ± 4 | 0.00 ± 0.00 |
| 12 | 3 ± 0.3 | 18 ± 2 |

The gloss readings were the average of two tests, the error reported being the range divided by two.

It was noted that the panels coated in a 45° bath showed about 5 units better gloss for Examples 7, 10, and 11, and about 20 units for Example 2 than those coated in the lower temperature bath. For the panels of Examples 1 and 5 no such improvement was observed.

Additionally it was noted that, in general, the lower the gel content, the better the solvent resistance of a cured electrodeposited film (double rubs with methyl ethyl ketone to expose a spot on the substrate). However, at very low gel contents, e.g., below 10%, the solvent-resistance data were scattered considerably.

The instant patent application is related to the following commonly-assigned patent applications of even date herewith, the disclosures of which are incorporated herein expressly by reference: Ser. No. 513,621 and Ser. No. 513,619.

What is claimed is:

1. A method of electrocoating an electrically conductive surface serving as a cathode in an electrical circuit comprising said cathode, an anode, and an aqueous electrodepositable composition wherein net unidirectional electric current is passed through said circuit for causing deposition of said composition on said cathode and the resulting electrodeposit is baked to cure it, said method being characterized by using as said composition one that comprises synthetic, cation-active, film-forming, amino-stabilized latex particles having latex microgel content that is no substantially above about 2%.

2. The method of claim 1 wherein said latex is a copolymer containing acrylate and/or methacrylate monomer units and is structurally cation-active by its containing monomer units that have secondary and/or tertiary amino functionality.

3. The method of claim 1 wherein there is crosslinkability of said resulting electrodeposit provided by hydroxyl groups present that are reactable upon curing of said resulting electrodeposit with blocked/isocyanate groups present therein.

4. The method of claim 1 wherein said aqueous electrodepositable composition contains a polyether surfactant and particulate material in the form of inorganic particles, plastic particles, and/or powder paint.

5. The method of claim 1 wherein said aqueous electrodepositable composition is acid-ionized, contains about 1-25% solids, and the latex present therein has average particle size not substantially smaller than about 1000 Å.

6. The method of claim 1 wherein said aqueous electrodepositable composition is maintained at a temperature of at least about 40° C.

7. The method of claim 1 wherein said aqueous electrodepositable composition is replenished with a replenishment composition that is like said aqueous electrodepositable composition except that it is richer in solids and lower in acid than said aqueous electrodepositable composition.

* * * * *